United States Patent [19]
Harris et al.

[11] Patent Number: 5,547,265
[45] Date of Patent: Aug. 20, 1996

[54] ANTI-LOCK BRAKING SYSTEM

[75] Inventors: Alan L. Harris, Coventry; Dennis Turner, Ridditch, both of England

[73] Assignee: Lucas Industries PLC, West Midlands, England

[21] Appl. No.: 397,061

[22] PCT Filed: Jul. 29, 1994

[86] PCT No.: PCT/GB94/01638

§ 371 Date: May 30, 1995

§ 102(e) Date: May 30, 1995

[87] PCT Pub. No.: WO95/03962

PCT Pub. Date: Feb. 9, 1995

[30] Foreign Application Priority Data

Jul. 31, 1993 [GB] United Kingdom ............... 9315895

[51] Int. Cl.⁶ ............................................. B60T 8/32
[52] U.S. Cl. ................ 303/10; 188/181 C; 303/122.12
[58] Field of Search ........................ 303/116.1, 10, 303/122.12, 11–12, 116.4, 116.3, 122.1, 20, 11; 188/181 C

[56] References Cited

U.S. PATENT DOCUMENTS

| | | | |
|---|---|---|---|
| 4,421,361 | 12/1983 | Arikawa et al. | 303/122.12 |
| 4,524,311 | 6/1985 | Yokota et al. | 303/10 |
| 4,753,492 | 6/1988 | Leiber et al. | 303/122.1 |
| 4,895,416 | 1/1990 | Tozu et al. | 303/122.1 |
| 5,000,520 | 3/1991 | Schmitt | 303/10 |
| 5,188,440 | 2/1993 | Muller et al. | 303/10 X |
| 5,197,787 | 3/1993 | Matsuda et al. | 303/10 |
| 5,281,014 | 1/1994 | Volz | 303/10 X |
| 5,295,737 | 3/1994 | Epple et al. | 303/11 |
| 5,454,632 | 10/1995 | Burgdorf et al. | 303/11 |
| 5,487,593 | 1/1996 | Potts et al. | 303/11 |

FOREIGN PATENT DOCUMENTS

| | | |
|---|---|---|
| 0175863 | 4/1986 | European Pat. Off. . |
| 3148979 | 10/1982 | Germany . |
| 362956 | 3/1988 | Germany . |

OTHER PUBLICATIONS

Patent Abstracts of Japan, vol. 12, No. 404 (M–757) (3251) 26 Oct. 1988 and JP, A, 63 145 163 (Omron Tateisi Electronics Co.) 17 Jun. 1988.

Patent Abstracts of Japan, vol. 15, No. 113 (M–1094) 18 Mar. 1991 & JP, A, 03 007 650 (Akebono Brake Ind.) 16 Jan. 1991.

Primary Examiner—Douglas C. Butler
Attorney, Agent, or Firm—Oblon, Spivak, McClelland, Maier, & Neustadt, P.C.

[57] ABSTRACT

An anti-lock braking system for a road vehicle having a plurality of hydraulically operated brake actuators, a plurality of control channels controlling the supply of hydraulic fluid to the brake actuators, an electrical supply and a hydraulic pump for supplying hydraulic fluid to the brake actuation circuit. The pump is driven by an electric motor energized by the power supply. The magnitude of the operating voltage at the pump motor is compared with a predetermined reference voltage. The physical demand upon the pump motor is reduced by inhibiting the control channels if the measured magnitude of the electric motor voltage is less than the reference value.

6 Claims, 5 Drawing Sheets

ANTI-LOCK BRAKING SYSTEM

The present invention relates to ABS (anti-lock) braking systems for road vehicles, for example as shown in EP 020485.

ABS systems are controlled by a dedicated electronic control unit (ECU) which is powered by the vehicle battery/alternator supply. The system includes control of valves in the hydraulic supply to the brake actuators at the individual axles or wheels, the hydraulic fluid being delivered to the solenoid valves from a hydraulic pump driven by an electric motor.

The voltage range within which typical ABS control systems are designed to operate is specified in terms of the voltage at the power supply connection of the ECU. However, the voltage at this point, and its relationship to voltages at other locations within the system, will depend upon details of the particular vehicle-type in which is it installed, for example, on the length and gauge of the cables, and on the fusing arrangements and the number of other vehicle systems (e.g. audio, ventilation etc.) which share the same power supply distribution cable.

It is normally considered to be impractical to design and approve different system hardware (e.g. pump-motors) to suit each individual installation, for example on cost considerations alone. Furthermore, the voltage available at the pump motor depends upon the current being drawn along the supply cable, which depends in turn upon how hard the driver is pressing the brake pedal. Thus, the worst case condition only occurs when the driver is pressing very hard. However, designing for the worst case installation with regard to this particular function is also generally considered to be uneconomic because it results in the vast majority of installations being over-engineered, and therefore potentially uncompetitive on price grounds.

In a worst case situation with a relatively small volt-drop from the battery to the ECU, but a relatively large volt drop from the battery to the pump-motor, a considerable increase in pump motor power rating may be needed in order to maintain the energy balance of the system all the way down to the minimum voltage threshold at which the ECU will operate. The use of a smaller motor could result in the pump being unable to scavenge all the fluid dumped from the brakes, so that the chambers of the expander fill up, brake pressure can no longer be reduced in response to solenoid energisation and the wheels lock. The sequence of wheel-lock cannot be predetermined, and so vehicle instability may result. Thus, the use in itself of smaller pump motors in the existing systems is not an acceptable option.

An object of the present invention is to establish a more acceptable solution to this problem.

In accordance with the present invention, the magnitude of the pump motor voltage is compared with a predetermined reference value and the physical demand upon the pump motor is arranged to be reduced if the measured magnitude of the voltage is below said predetermined reference value.

In one embodiment, for example, the physical demand on the pump motor is reduced by arranging for the control channel(s) controlling the brake actuator(s) at one or more of the front wheels of the vehicle to be inhibited, whereby full ABS control is only available on the other wheels (including the rear wheels). Inhibiting ABS activity at one or more of the front wheels reduces the amount of fluid dumped into the expander chamber and therefore the rate at which the fluid volume that the pump must return to the higher pressure actuation circuit. This ensures that the expander chambers do not become saturated.

The voltage measurement is preferably made within the ECU itself but can equally well be made in additional hardware provided for the purpose.

The reference value or voltage can be a predetermined value based upon examination of the electrical installation of the specific vehicle. The value for a particular typical installation might be for example, 9 volts but this will vary from vehicle model to model as well as vehicle to vehicle.

Usually, the aforegoing measurement would be made actually during operation when the ABS may have been invoked. However, it could equally well be made during the normal start-up check routine at zero or up to a predetermined low running speed (typically 6 Km/h) and in addition at some predetermined interval during normal running of the vehicle.

The Start Up procedure, relating to the motor, usually consists of supplying the pump motor with power for a short period of time (say 100 ms) and then checking after switch off for the presence of a generated voltage, caused by continued rotation of the motor, this therefore confirming that the pump motor is functioning both mechanically and electrically. The normal running test would also consist of momentarily applying power to the pump motor and performing the motor voltage comparison with the predetermined minimum voltage value.

The invention is described further hereinafter, by way of example only, with reference to the accompanying drawings, in which.

Figure 1:
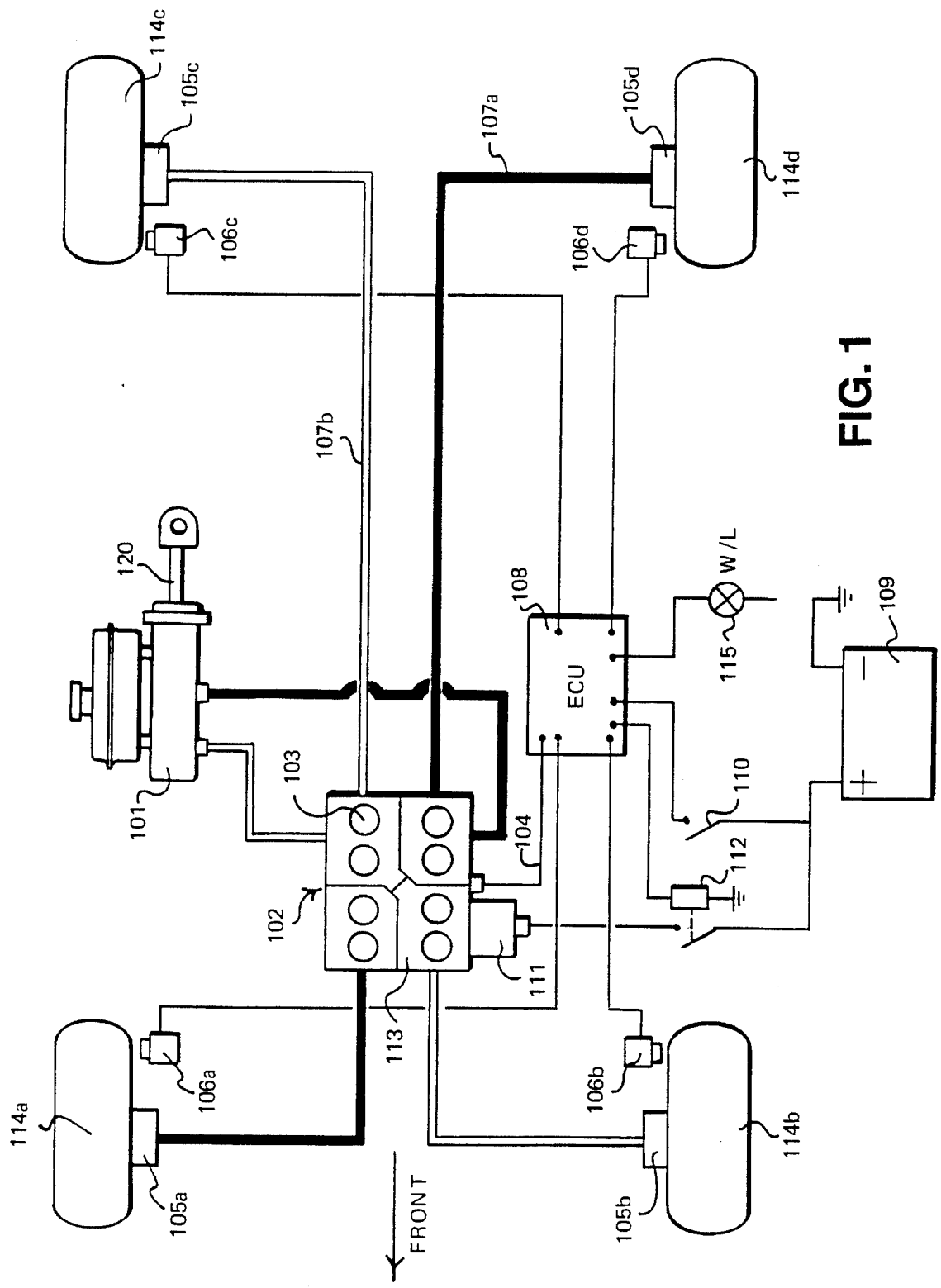
FIG. 1 is a schematic diagram of the basic hydraulic and electrical arrangement of a typical vehicle to which the present invention can be applied.

Referring first to FIG. 1, there is illustrated highly schematically the braking system for a vehicle having four wheels 114, two at the front 114a,144b and two at the rear 114c,114d. The system is of the X-split type having independent hydraulic circuits, with the first circuit 107a (black) actuating the front offside and rear nearside wheel brakes 105a 105d and the second circuit 107b actuating the front rear side and rear offside wheel brakes 105b,105c. A brake pedal (not shown) is mechanically connected to the actuating plunger 120 of a dual circuit master cylinder 101. The master cylinder 101 is connected to a modulator 102 comprising a plurality of control channels 113 having control valves 103, connected to an electronic control unit (ECU) 108 by control lines 104, the control valves 103 being adapted to control the communication between the master cylinder 101 and the brake actuators 105 controlling the wheels 114. Rotational speed of each wheel 114 is sensed individually by wheel speed sensors 106a–106d connected to the ECU 108 which is adapted to control the control valves 103 of the modulator 102 in dependence upon signals received from the wheel speed sensors 106.

The ECU 108 is powered from a battery/alternator circuit 109 of the vehicle via an ignition switch 110. The battery/alternator circuit 109 also supplies power to modulator pump motor 111 via a relay valve 112 controlled from signals generated by the ECU 108. Should the ECU 108 determine that an appropriate fault has occurred then a fault warning indicator (warning lamp) 115 is activated.

Figure 2:
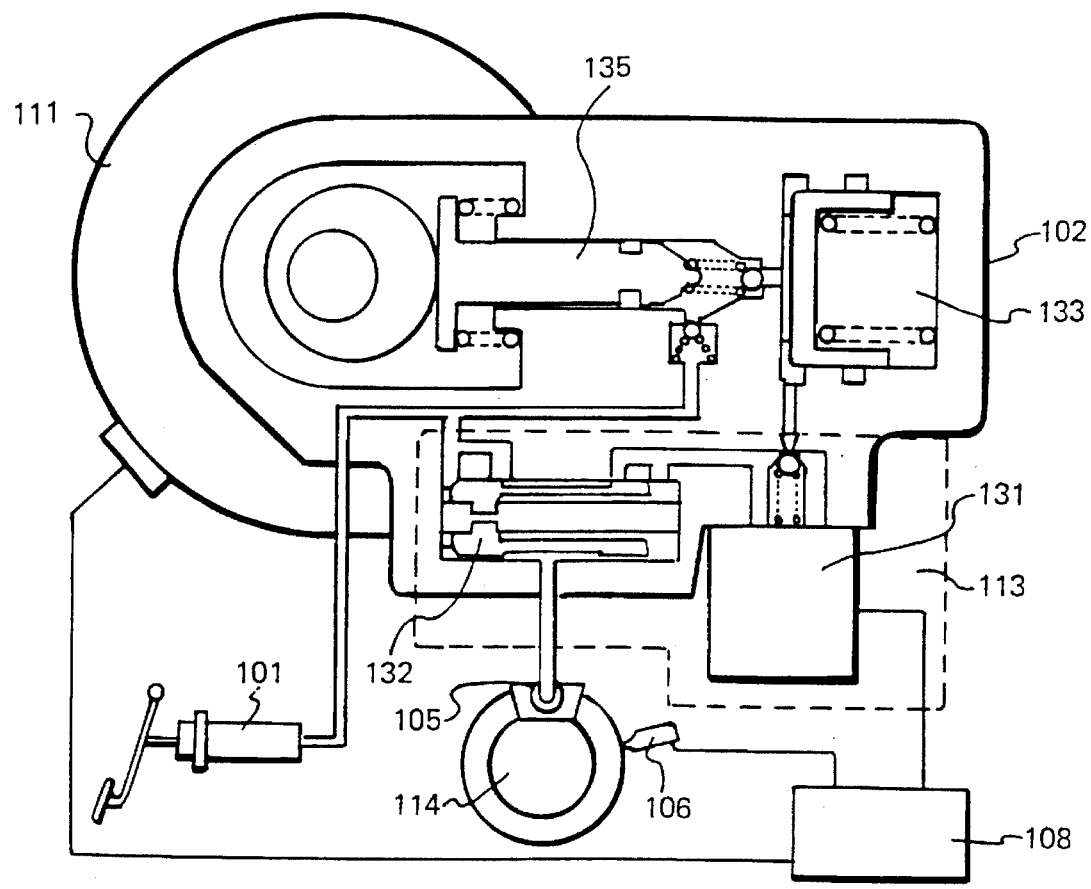
FIG. 2 is a diagrammatic partially sectional view of one possible embodiment of a modulator and a single control channel.

Referring now to FIG. 2, there is illustrated one possible embodiment of a modulator 102, showing the construction of a single control channel 113. The same reference numerals as in FIG. 1 have been used for equivalent components. FIG. 2 shows the ECU 108 receiving signals from a single wheel speed sensor 106 which senses the rotational speed of a wheel 114 braked by a brake actuator 105.

The master cylinder 101 supplies fluid to the brake actuator 105 via the modulator 102 which has at least one control channel 113, consisting for example of a flow valve 132 and solenoid-controlled dump valve 131. Alternatively, the control channel could be formed by two solenoid controlled valves of the conventional inlet and dump configuration.

A electrically powered pump motor 111 is adapted to drive a pump 135 to scavenge fluid, dumped from the brake by opening of the dump valve 131, from a low pressure reservoir or expander chamber 133, in order to return the fluid dumped from the brake actuator 105 back to the master cylinder 101 for controlled reapplication of the brake by the control channel 136.

If the voltage drop between the power supply and the pump motor is large, then a relatively large, expensive pump motor 111 will be essential if braking stability is to be maintained under worst case conditions. However, since electrical failure of either the alternator or the battery would normally be a prerequisite to the presence of such low system voltages, some impairment of the system's performance can be accepted, provided that the function is reduced in a predetermined manner.

It is known for current ABS systems to include a pump motor-monitor feature which feeds pump motor voltage into the ECU as part of a failsafe concept. The voltage is interpreted in a binary fashion, i.e. the result can be either "voltage" or "no voltage". The present invention makes use of the recognition that it is possible to measure the motor voltage with more precision either inside the ECU or outside, and to reduce the demand upon the pump motor if the measured voltage falls below a predetermined critical level during or before, ABS operation.

Figure 3:
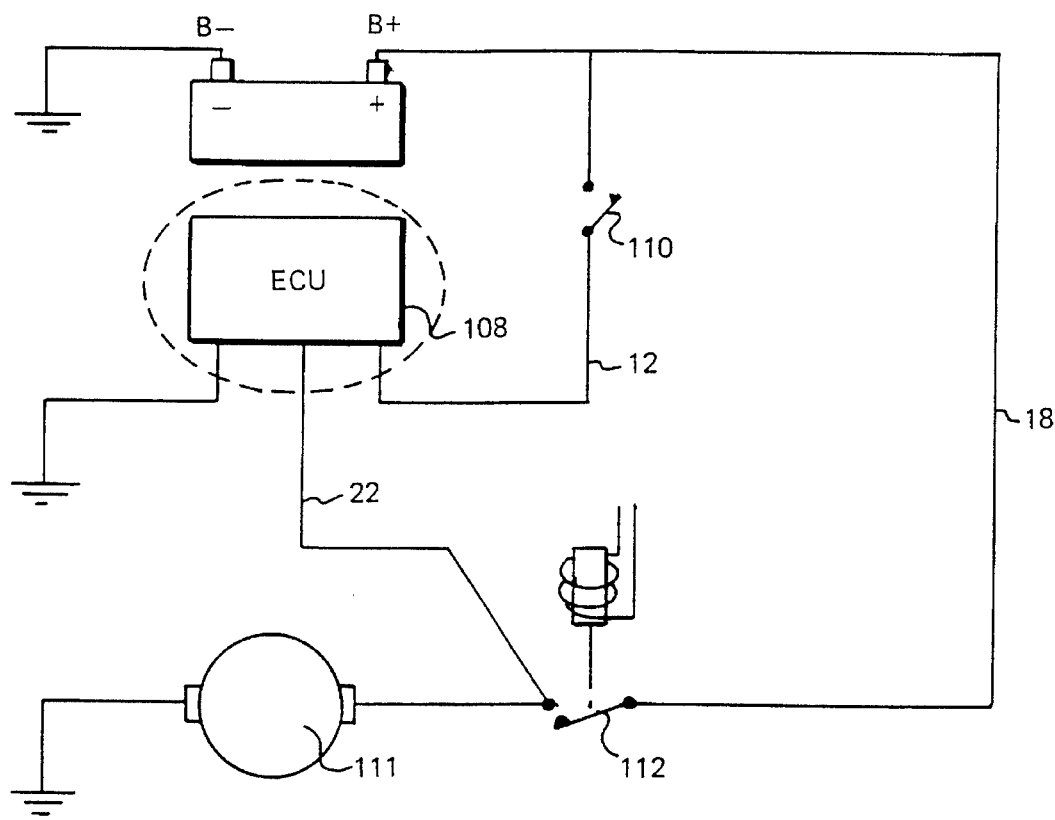
FIG. 3 is a very basic illustration of part of an ABS system incorporating the present invention.

Referring now to FIG. 3 of the drawings, there is shown an electronic control unit (ECU) 108 for an ABS system to which power is supplied from the vehicle battery B+ via a line 12 containing the usual ignition switch 110.

Motor 111 drives the hydraulic pump (not shown) which supplies hydraulic fluid within the ABS system. One side of the pump motor 111 is connected to ground/chassis B−. The other side of the motor 111 is connected to the battery B+ terminal by a line 18 containing the relay operated switch 112. Operation of the relay closes the switch 112 to energise the motor 111. A line 22 leads from the side of the switch 112 remote from the B+ terminal to an input of the ECU 108. This line 22 enables the voltage on the motor 111 to be monitored and measured within the ECU 108 (or elsewhere—see below) by conventional voltage measuring techniques.

By this provision, instead of (or in addition to) the conventional facility for measuring techniques at the CPU for the presence of voltage or no voltage at the non-earthed terminal, the present system enables the actual level of the voltage to be quantified. Detection of the voltage assuming a value below a predetermined critical value is then used to reduce the demand upon the pump-motor 111 in one or more ways. For example, a preferred way to reduce the energy requirement (demand) of the motor 111 is to arrange for the control channels 113 (solenoid(s)) controlling at least one of the front wheels 114 to be inhibited if the predetermined low voltage value at the pump motor 111 is detected, whereby this wheel or wheels is allowed to lock, but the rear wheels 114c,114d remain under full normal ABS control. This situation can be tolerated in this condition since the back wheels are acknowledged to be more important than the front in achieving stability during emergency braking. The latter mode of control is preferably arranged to continue until either ABS is no longer required, or until the voltage supply to the ECU itself falls to below its allowed threshold and the whole electrical system is effectively inoperable.

Figure 4:
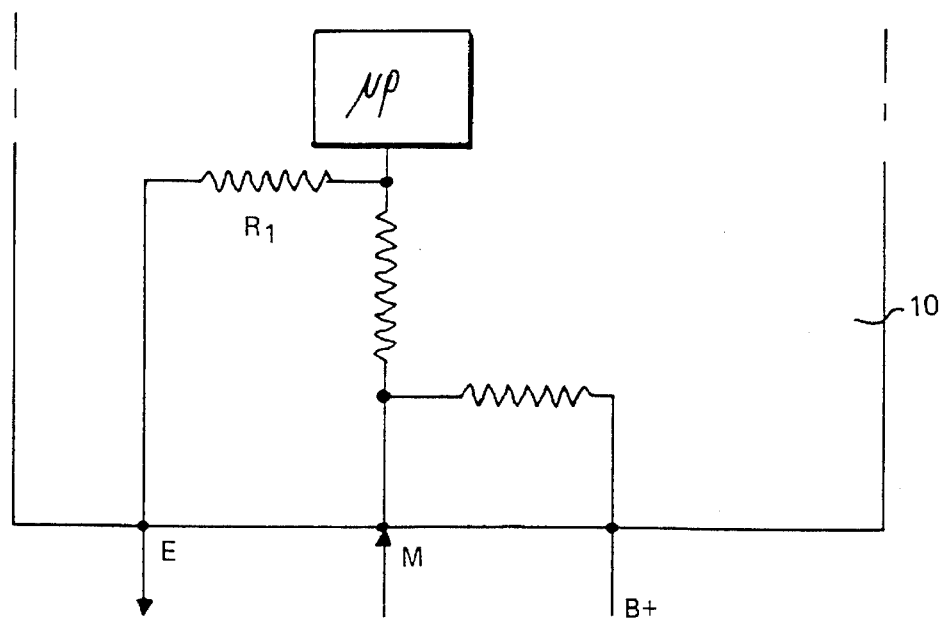
FIG. 4 is a simplified sketch of one possible embodiment of a modified ECU for use with the present invention.

In the case of existing systems having an ECU in which there is no internal facility or capacity for voltage measurement in the aforegoing manner, an alternative possibility is for the existing motor-monitor binary detection to be by-passed and the motor-monitor cable to be redirected to a different output pin of the ECU, to which suitable voltage-measuring hardware is connected. This situation is illustrated in a highly simplified manner in FIG. 4 where the motor monitor signal fed to pin M on the ECU is picked off via the resistor $R_1$ and fed out again on pin E.

A further alternative possibility envisaged by the present invention is to measure the voltage on the motor 111 during the normal start-up check-out routine (either at zero speed or up to a predetermined low speed, e.g. 6 Km/h) and to disable the complete ABS system, i.e. even before ABS operation may be required, and energise the warning lamp.

Figure 5:
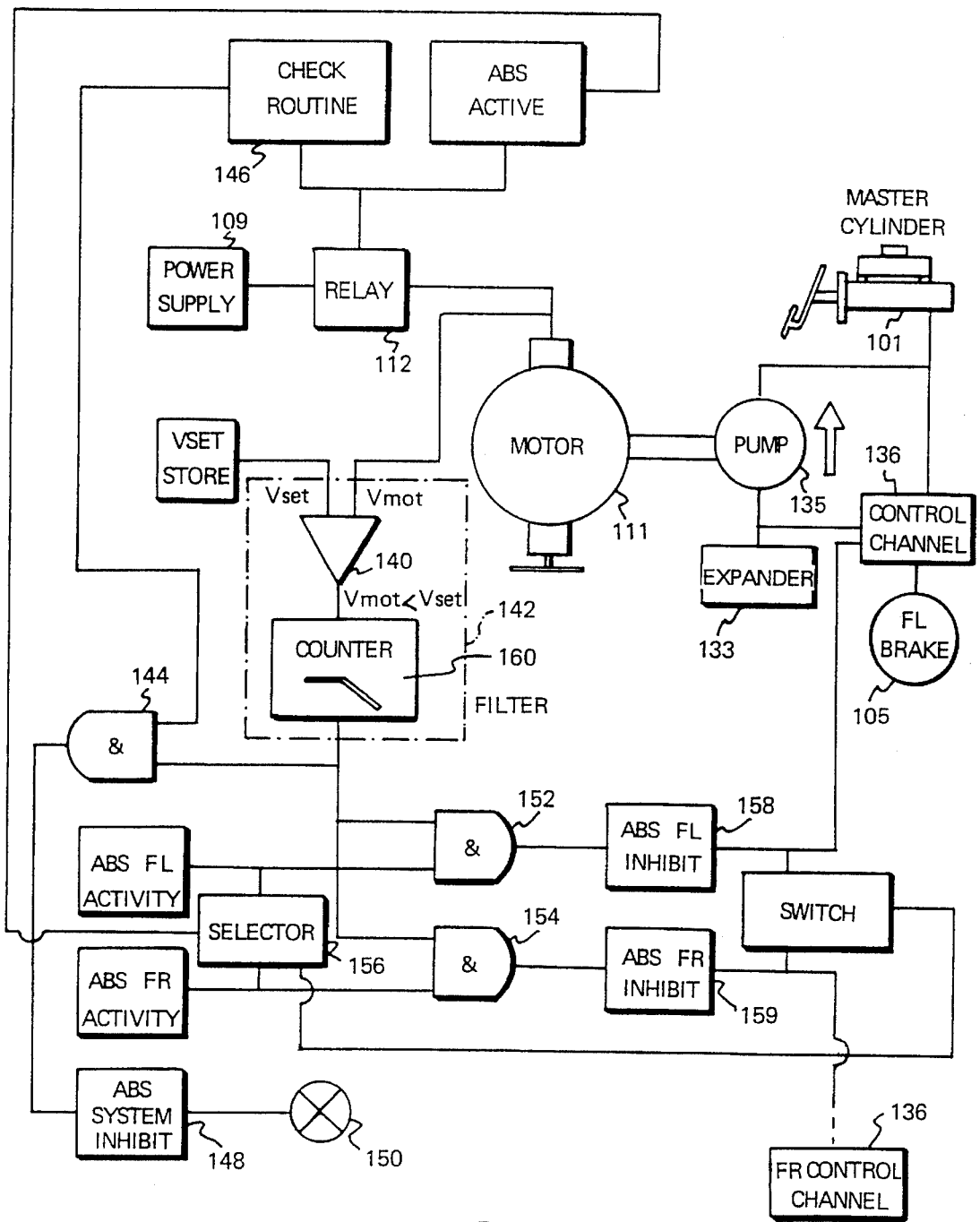
FIG. 5 is a more detailed system diagram of one embodiment in accordance with the present invention.

Referring now to FIG. 5, there is shown in more detail the structure of one possible embodiment by which the above described operation can be achieved. Although shown in hardware terms this operation would in practice normally be achieved by software within the ECU itself. The same reference numerals as in the previous Figures are again used where appropriate.

The system power supply 109 is connected to the pump motor 111 via a switch means (relay 112) operated in the event of either ABS activity, a start-up test or normal running check.

The system power supply is connected to the pump motor via a switch means operated in the event of either ABS activity, a start-up test or normal running check. In ABS Active mode the Relay is energised for the duration of the ABS cycle, whilst a short duration pulse is applied by the Check/Normal running routine. It is emphasised that both the start-up and normal running routines are optional; the main intention is to monitor the pump motor voltage during ABS. The relay 112 powers up the motor 111 which establishes a voltage (Vmot) across it. This generated voltage value is compared against a minimum threshold value (Vset) in a comparator 140. Should Vmot be less than Vset the output of the comparator 140 triggers the operation of a filter 142 the intention of which is to prevent an ABS system inhibit or partial shut down 148 from working unless the under voltage condition exists for a duration longer than that which could normally be considered a transient effect. Once the filter 142 is triggered the comparator output is monitored and if the filter considers that the duration for which Vmot is less that Vset is longer that a predetermined condition then the output on the filter goes high. The filter output is fed into a first AND gate 144 together with a signal from an element 146 indicative of the presence of either the Start-up or normal running check routine.

If both signals are present i.e. the motor voltage test has failed the system and it was during either of the start-up or check routines, then a warning lamp 150 is illuminated and the ABS system is disabled via the inhibit 148. The output of filter 142 is also fed into two other AND gates 152,154 whose other inputs are signals representing ABS activity on the associated front wheels. These signals could be replaced by a single signal representing any ABS activity on the associated front wheels this process being determined by a selector 156 which also determines whether the inhibit signal from one channel is allowed to influence the inhibit function of the other channel.

The choice between using individual or combined signals is made by the controller in dependence upon other operating parameters of the vehicle i.e. vehicle stability or can in fact be preset for a particular system design. In the latter case either the selector or the individual Activity items would be deleted depending upon the choice made. Therefore for each channel of the front wheels a respective inhibit Switch 158,159 is enabled if both inputs are present. The inhibit signal is then further fed into the control channel 136 of the respective front wheels, preventing that control channel from relieving the applied brake pressure.

Optionally, an inhibit signal from one of said inhibit switch means could be arranged to inhibit ABS activity on said other control channel, thus generating an inhibit condition on the control channels associated with the front axle of the vehicle.

The filter 142 in FIG. 5 is designed to prevent the inhibit of the front brake(s) function due to transients, (either electrical noise or short duration loads) affecting (lowering) the motor supply voltage.

The basis principle involved in operating the filter 142 is that of incrementing a counter 160 (see FIG. 5) with each processor cycle in either a positive direction, if the motor voltage is lower than the preset minimum or a negative direction, if the motor voltage is higher than the predetermined minimum value.

Therefore, upon triggering of the filter 142 the counter 160 is started. If during the next ECU scan (algorythm) cycle the motor voltage value remains lower than said predetermined minimum, as determined by the resulting output of the comparator 140 then the counter 160 is incremented and, if the value is higher then the counter is decremented. Should the counter, once triggered, again react zero value, the filter activity is terminated and can only be re-initiated by the aforementioned trigger process.

should the counter continue to run until the counter value reaches a predetermined maximum, then the filter output is set to provide a "fail" or "inhibit" signal.

Figure 7A:
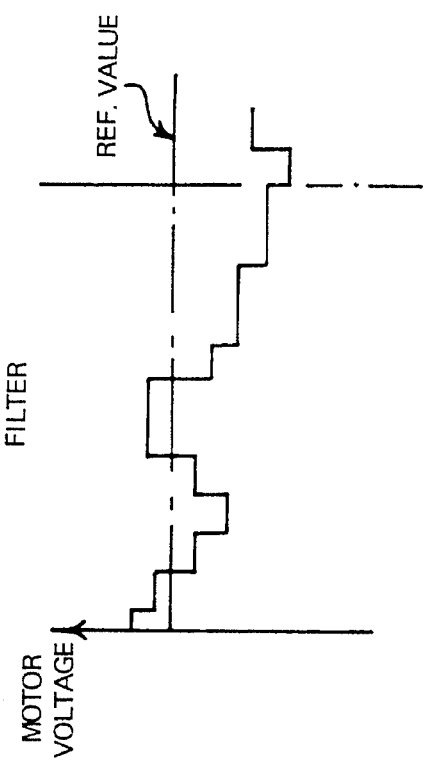
FIGS. 7a and 7b are graphical illustrations showing the operation of an embodiment of a filter which can be used in the present invention.
Figure 7B:
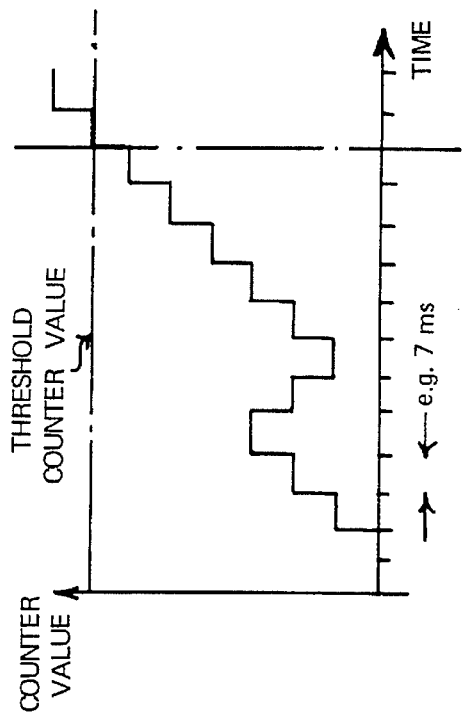
Figure 6:
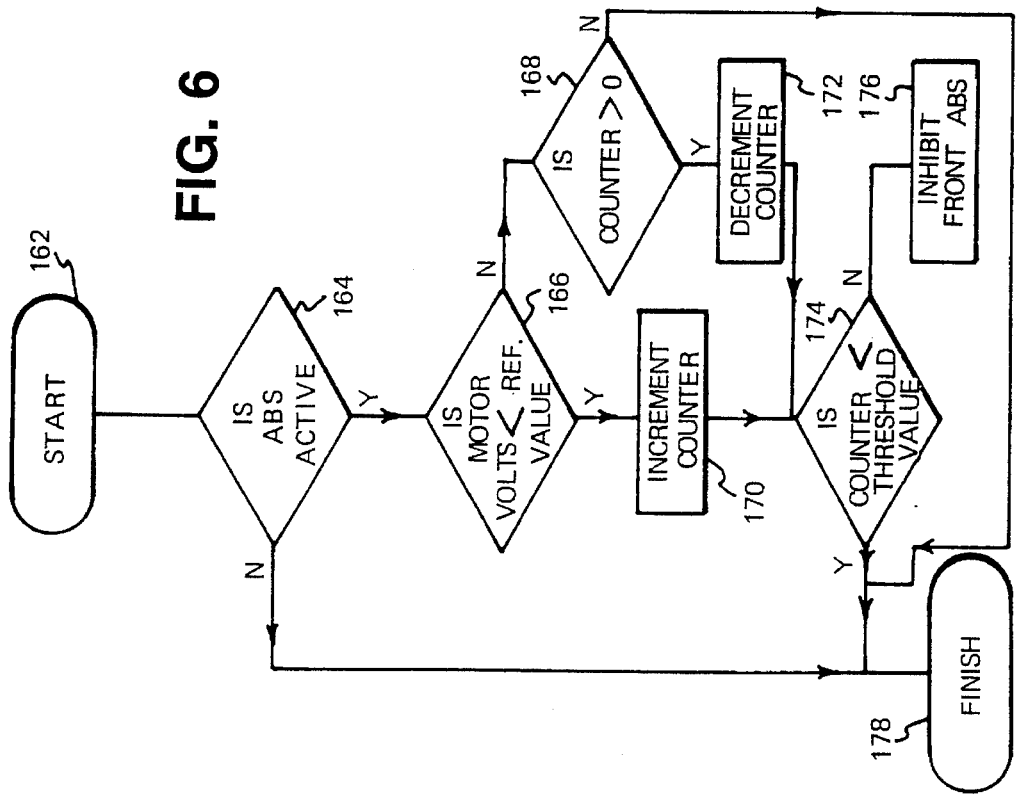
FIG. 6 is a basic flow chart illustrating the operation of an embodiment in accordance with the invention.

This operation is illustrated by the flow diagram of FIG. 6 and graphs of FIG. 7. The various boxes of the flow diagram of FIG. 6 are further identified as follows.

| 162 | Start |
| --- | --- |
| 164 | is the ABS active? |
| 166 | is the motor voltage less than the reference value? |
| 168 | is the counter value greater than zero? |
| 170 | increment counter |
| 172 | decrement counter |
| 174 | is the counter value less than the threshold value? |
| 176 | inhibit front ABS |
| 178 | finish |

The use of the technique of the present invention enables considerable cost saving through the use of less powerful pump motors than would otherwise be the case.

What is claimed is:

1. An anti-lock braking system for a road vehicle, comprising:

(a) a plurality of hydraulically operated brake actuators;

(b) a plurality of control channels controlling the supply of hydraulic fluid to the brake actuators;

(c) electrical power supply means;

(d) a hydraulic pump for supplying hydraulic fluid to a brake actuation circuit, the pump being driven by an electric motor energized by said power supply means, (e) said electric motor being connected to a monitor line for determining voltage supplied by the power supply means at the electric motor;

(f) comparing means connected to said monitor line for comparing the operating voltage at the electric motor with a predetermined reference value; and (g) means for inhibiting said control channels if the electric motor voltage is less than said reference value.

2. A system according to claim 1, wherein said inhibiting means selectively inhibits the control channels controlling the brake actuator at least one of the front wheels of the vehicle, whereby full ABS control is only available on the remaining wheels.

3. A system according to claim 1, wherein the voltage comparison is made during normal running operation of the vehicle.

4. A system according to claim 1, wherein the voltage comparison is arranged to be made during a start up routine at one of a zero vehicle speed and up to a predetermined low running speed, and if it is determined that the operating voltage on the pump motor, is less than said reference level, the complete ABS control system is arranged to be disabled, leaving non-ABS operation only.

5. An anti-lock braking system for a road vehicle, comprising:

(a) a plurality of hydraulically operated brake actuators;

(b) a plurality of control channels controlling the supply of hydraulic fluid to the brake actuators;

(c) electrical power supply means;

(d) a hydraulic pump for supplying hydraulic fluid to a brake actuation circuit, the pump being driven by an electric motor energized by said power supply means, (e) said electric motor being connected to a monitor line for determining voltage supplied by the power supply means at the electric motor;

(f) comparing means connected to said monitor line for comparing the operating voltage at the electric motor with a predetermined reference value;

(g) means for inhibiting said control channels if the electric motor voltage is less than said reference value, (h) a filter adapted to prevent the inhibition of brake actuator function due to transients in any of electrical noise and short duration load changes.

6. A system according to claim 5, wherein said filter includes a counter which is arranged to be incremented with each ECU scan cycle in one direction, if the measured motor voltage is lower than the preset minimum, and in the opposite direction if the motor voltage is higher than the predetermined minimum value, said inhibit of the brake actuator function only being permitted if the counter value reaches a predetermined maximum.

* * * * *